United States Patent [19]

DeNicolo et al.

[11] Patent Number: 4,512,760

[45] Date of Patent: Apr. 23, 1985

[54] METHOD AND DEVICE FOR SELECTIVE SEPARATION OF FINE METAL PARTICLES

[76] Inventors: William DeNicolo, 6832 N. Mendota, Chicago, Ill. 60646; Pershing Nakada, 832 Poplar Ave., Elmhurst, Ill. 60126

[21] Appl. No.: 572,193

[22] Filed: Jan. 19, 1984

[51] Int. Cl.[3] .............................................. B01D 21/26

[52] U.S. Cl. ...................................... 494/37; 209/199; 494/60

[58] Field of Search ........................ 494/37, 43, 60, 66, 494/76, 79, 74; 209/199, 198, 60, 172, 175

[56] References Cited

U.S. PATENT DOCUMENTS

| | | | |
|---|---|---|---|
| 358,587 | 3/1987 | Backstrom | 494/79 |
| 366,483 | 7/1987 | Poller | 494/79 |
| 1,452,181 | 4/1923 | Butler | 209/199 |
| 1,939,143 | 12/1933 | Silver | 209/199 |
| 2,261,394 | 11/1941 | Lindgren | 494/79 |
| 4,279,741 | 7/1981 | Campbell | 494/60 |

*Primary Examiner*—Robert W. Jenkins
*Attorney, Agent, or Firm*—Jerome Goldberg

[57] ABSTRACT

A method for selective separation of fine metal particles from a mixture of fine particles, including the rotating of a bowl to generate a centrifugal force, building a wall of mercury media inside the bowl so that the outer surface of the mercury contacts the inner surface of the bowl when the bowl is rotating, and injecting a slurry comprising a mixture of water and fine particles of metal and sand, clay and the like, to propel the slurry against the mercury wall, so that the heavier metal particles as compared with the mercury contact, penetrate and pass through the mercury, and the particles lighter than the mercury are blocked from entry into the mercury and discharged from the bowl with the water. The injecting of additional slurry into the bowl increases the metal particle penetration to cause the formation of a layer of metal particles between the mercury and the inner surface of the bowl.

The device used for selectively separating the metal particles heavier than the mercury from the lighter particles in the slurry includes a bowl comprising a plurality of compartments for holding the mercury substance, so that a cylindrical wall is formed around the inside of the bowl, prior to injecting the slurry into the bowl. Openings between compartments enable the mercury to be evenly distributed in the compartments. A deflector plate is mounted in the bowl spaced from the bottom to guide the slurry toward the lower end of the cylindrical mercury wall.

19 Claims, 18 Drawing Figures

METHOD AND DEVICE FOR SELECTIVE SEPARATION OF FINE METAL PARTICLES

BACKGROUND OF THE INVENTION

This invention relates generally to the selective separation of particles of metal from a mixture of particles, and more specifically relates to the selective separation of fine metal particles from a mixture of fine particles of metal and sand, clay and the like, by injecting the fine particle mixture against a mercury media, so that the metal particles heavier than the media penetrate the media and the other particles lighter than the media are rejected by the media. Still more specifically, the invention relates to a particle separator utilizing a centrifugal force to increase the weight and shorten the "fall time" of particles and thereby cause metal particles of a mixture having a greater specific gravity than a media substance, to contact, and penetrate the media.

As is well known, numerous devices and methods have been used heretofore for separating precious metal particles, such as gold particles from particles of sand, clay and the like. The various methods commonly used are sluicing, leaching, and amalgamation and were generally successful for extracting precious metal particles larger than one millimeter.

It is believed that there is a vast supply of various kinds of metals in nature in the form of fine particles and microfine particles (less than 60 microns in size). Sluicing techniques have heretofore been tried to extract such fine particles of metal and recovery has been minimal and therefore unprofitable. This is attributed in part to the unpredictability of the rate of descent ("settlement or fall time rate") of the fine metallic particles through water. Moreover, when the metal particles are less than 60 microns, the surface area of the particles become exceedingly more important. The greater the flatness of the particles as compared to a spherical particle (minimum surface area) the rate of descent through the liquid is further decreased. (The flatness factor of a particle has been defined as the sum of the particle length and width divided by twice the thickness.) The greater the particle flatness, the greater the surface area of the particle, and the more frictional drag developes upon descent or movement through liquid, to impede movement. Therefore, to realize any fine metal particle recovery with the sluicing method, the water velocities must be delicately controlled.

Amalgamation processes have also been previously employed for extracting fine metal particles. Amalgamation separation requires a clean surface for the wetting and contact of the metal particles with a mercury surface, causing the metal particles to cling to the mercury surface and later to be separated from the mercury by any conventional means (such as electrolysis or distillation). Fine metal particles, however, do not readiy penetrate the mercury surface. This may be attributed to a thin water film collecting on the surface of the mercury which creates a barrier between the mercury and the particles trying to penetrate. Penetration by the fine metal particles is further inhibited by the flatness factor of the particles. When the surface area of the fine metal particles is greater, the penetrating capability of such particles is reduced particularly for overcoming any surface film.

U.S. Pat. No. 1,452,181, BUTLER (1923) entitled "Centrifugal Amalgamator" discloses a device in which material comprising ground ore and sand, water and mercury are injected therein and then subjected to a centrifugal force. The metal particles become separated from the ores and sand and brought into contact with successive amalgamated surfaces and the mercury inserted in the device, as the material is tumbled through the device. The metal particles having an affinity for mercury surfaces cling thereto. The mercury material is discharged from the device and the metal particles later collected, and the metal particles on the amalgamated surfaces are removed. BUTLER uses the centrifugal force to separate the metal particles from the sand so that the metal particles could come into contact with the amalgamated surfaces and the surfaces of the mercury inserted into the device which fill up successive troughs.

The invention herein utilizes the centrifugal force to initially build up a wall of a media such as mercury, and thereafter to propel a mixture of fine metal particles and particles of sand and the like against the media wall, so that heavier metal particles as compared with the mercury, contact penetrate and pass through the media and other particles lighter than the mercury, are blocked from entry into the media and discharged from the device.

A primary object of this invention is to provide a process for selectively separating fine metal particles from particles of sand, clay and the like.

Another primary object of this invention is to provide a mechanical process that selectively separates micron and submicron size particles that have a greater specific gravity than a media such as mercury and simultaneously to reject particles having a lighter specific gravity than the mercury.

Another object is to provide a process utilizing a centrifugal force to initially build up a wall of a media such as mercury and thereafter to impinge the media wall with a mixture including particles of metal, sand, clay and the like, causing selected metal particles to contact and penetrate the media and the other particles to be rejected by the media.

Another object is to provide a process for extracting fine metal particles from a mixture of particles by utilizing a media substance having a specific gravity less than the fine metal particles desired to penetrate and pass through the media but a greater specific gravity than the particles to be rejected by the media.

Another object is to selectively separate fine metal particles from particles of sand, clay and the like, by causing the fine metal particles to penetrate and pass through a media and build up a layer of the fine metal particles.

Still another object of the invention is to provide a method for the selective separation of particles of micron or smaller size including micron size particles of gold, platinum, and other metals which have a greater specific gravity than mercury.

Still another object is to utilize a centrifugal force to construct a wall of mercury around the inside surface of a rotating bowl; thereafter to propel a mixture including fine particles of metal and sand, clay and the like against the wall of mercury whereby fine metal particles having a specific gravity greater than the mercury, contact, penetrate and pass through the media wall to develope a layer of the fine metal particles between the inside surface of the bowl and the mercury wall.

Another object is to provide a selective separator device including a bowl having a plurality of scalloped compartments to receive a media substance through which fine metal particles having a specific gravity greater than the media penetrate and particles having a specific gravity less than the media are rejected.

Another object is to terminate the outer ends of the scalloped compartment with a cap to confine the mercury media in the compartment as the bowl is rotated for providing a centrifugal force.

SUMMARY OF THE INVENTION

The subject invention is directed to the selective separation of fine metal particles having a specific gravity greater than a media substance and simultaneously rejecting fine metal particles having a specific gravity less than the media. To accomplish the selective separation, the media substance, which may be mercury, and a mixture of fine particles of metal, clay, sand, silt, and the like ("aggregate") mixed with water to form a slurry, are subjected to a centrifugal force. Centrifuging the particles increases the weight of the particles and shortens the "fall time" of the same particles, in proportion to the "g" forces applied. The mercury media acts as a selective collector of the various metal particles in the slurry that have a heavier specific gravity than the mercury media and a rejector of the particles having a lighter specific gravity than the media. The decrease in the fall time, enables the micron and submicron sized particles to be either collected or rejected by the mercury media.

The invention provides a method for the selective separation of fine metal particles from a mixture of fine particles of metal, clay, and sand and the like, including the rotating of a bowl to generate a centrifugal force; introducing a media substance such as mercury into the bowl to build up a wall of the mercury against the inside surface of the bowl when the bowl is rotating; and injecting a slurry containing water mixed with the mixture of fine particles of metal, clay and sand sand and the like, so that the slurry is propelled into contact with the mercury wall and flows therealong. Metal particles heavier than the mercury, contact and penetrate the mercury media and the other particles lighter than the mercury media are rejected by the media and flow out from the bowl. The fine metal particles having penetrated the media, move within the media and finally pass through the media to the inside surface of the bowl. Continuing to add slurry into the bowl, increases the flow of metal particles through the media substance and a layer of metal particles is formed between the inside surface of the bowl and the mercury media substance.

The device used to practice the afore-described method includes a bowl coupled to a drive means for rotating the bowl to generate a centrifugal force. The bowl includes a plurality of compartments covered by a cap for retaining the media substance when the bowl is rotating. Spaced apart rib members separate the compartments. Grooves are formed in the ribs to provide communication between one compartment and the next compartment, so that the media substance is evenly distributed in the compartments. A deflector plate is mounted in the bowl spaced from the bottom to guide the slurry toward the lower end of the cylindrical mercury wall. An input feed tube is secured to the deflector plate. The plate includes an opening for passing fluid from the input tube to the bowl. The slurry containing the particles of metal and sand and the like is injected into the device via the input feed tube, and flows along the media surface until the slurry reaches a volume sufficient to scale the cap covering the compartments for discharge from the bowl.

BRIEF DESCRIPTION OF THE DRAWINGS

Referring now to the several figures of the drawings in which the same characters of reference are employed to indicate corresponding similar parts throughout the several figures of the drawings.

DESCRIPTION OF THE PREFERRED EMBODIMENT

Figure 1:
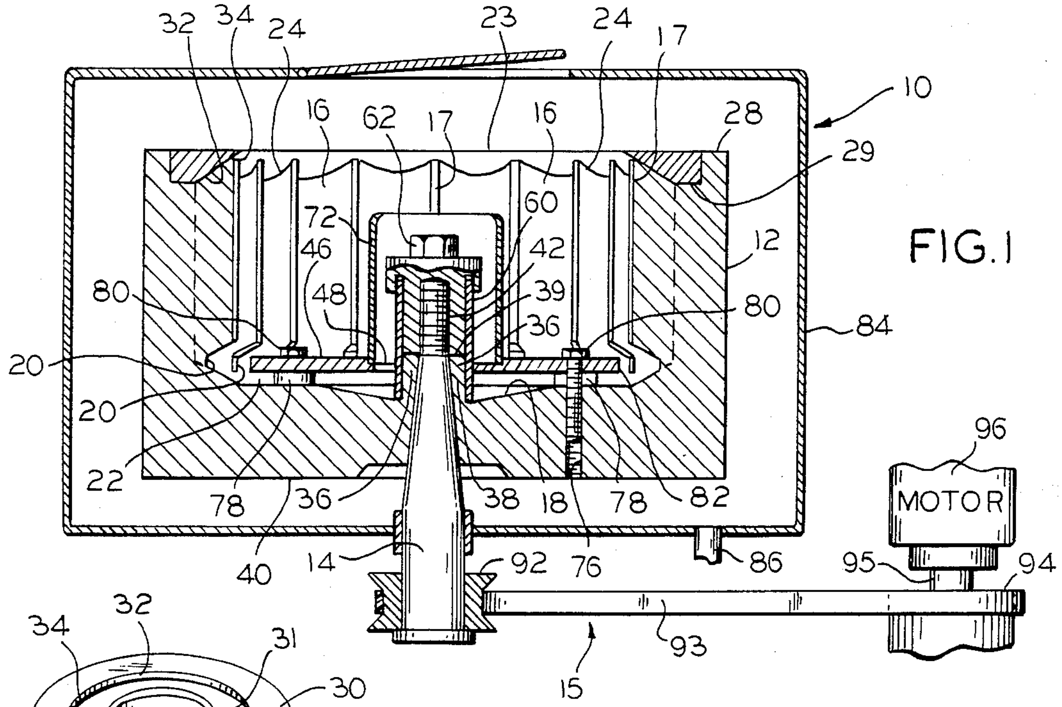
FIG. 1 is a sectional view of the device embodying the principals of the invention.

Referring now to FIG. 1 of the drawings, the reference numeral 10 indicates generally a selective separator for separating metal particles from a mixture of fine particles. The selective separator 10 comprises a bowl or container 12 which is secured on a spindle 14. A drive means 15 (FIGS. 1 and 2) is coupled to the spindle 14 for generating a centrifugal force in the bowl 12. The drive means 15 may be of the type used in the conventional centrifuges.

The bowl 12 includes a plurality of scalloped compartments 16 spaced apart by ribs 17 around the inside surface 18 of the bowl 12. Each scalloped compartment 16 is concave and formed to a one half cylindrical cavity.

Figure 10:
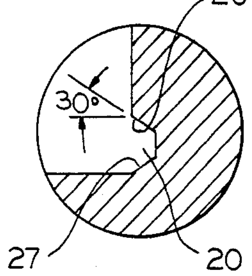
FIG. 10 is a fragmentary sectional view illustrating the groove in the rib.
Figure 11:
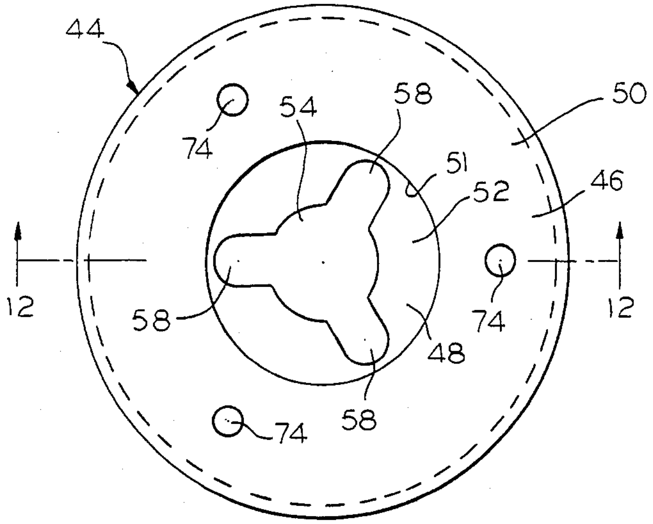
FIG. 11 is a top view of the deflector plate.
Figure 14:
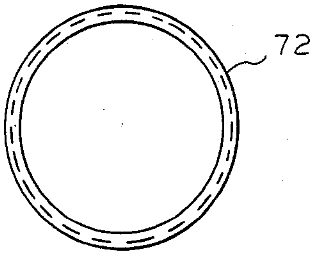
FIG. 14 is a top view of the input feed tube.
Figure 12:
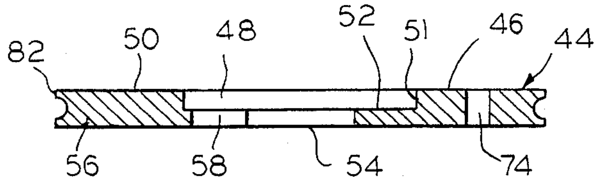
FIG. 12 is a sectional view of the deflector plate taken on the plane of the line 12—12 in FIG. 11 and viewed in the direction indicated.
Figure 13:
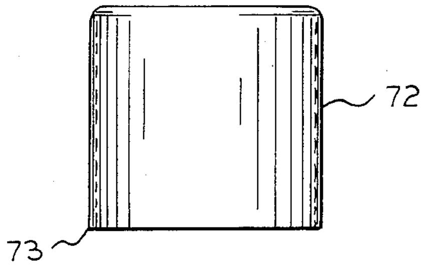
FIG. 13 is a side view of the input feed tube.

A groove 20 is formed in the ribs 17 adjacent the bottom 22 of the bowl 12 and communicates one compartment 16 with the next compartment 16. The scallops 16 extend from the bottom 22 of the bowl 12 to a level spaced form the top 23 of the bowl 12. The outer edges 24 of the scallops 16 are arcuate, and angled upward and inward. As may be seen from FIG. 4 the angle of incline of the outer edges 24 are approximately thirty degrees with respect to a horizontal plane. The defining surfaces 26,27 of the grooves 20 are also approximately thirty degrees (FIG. 10).

A circular outer rim 28 extends around the top 23 of the bowl 12. A ledge 29 is recessed from the rim 28. A cap 30 having a central opening 31 is positioned on the ledge 29 aligned with the rim 28, and rests on the outer edges 24 of the scallops 16. The cap 30 is fixidly secured to the top 23 of the bowl 12.

The inside surface 32 of the cap 30 is also inclined upward and inward and angled complementary with the outer edges 24 of the scallops 16. The cap 30 extends further inward than outer edges 24 of the scallops 16, to provide a circular upwardly inclining overhang or lip 34.

Figure 4:
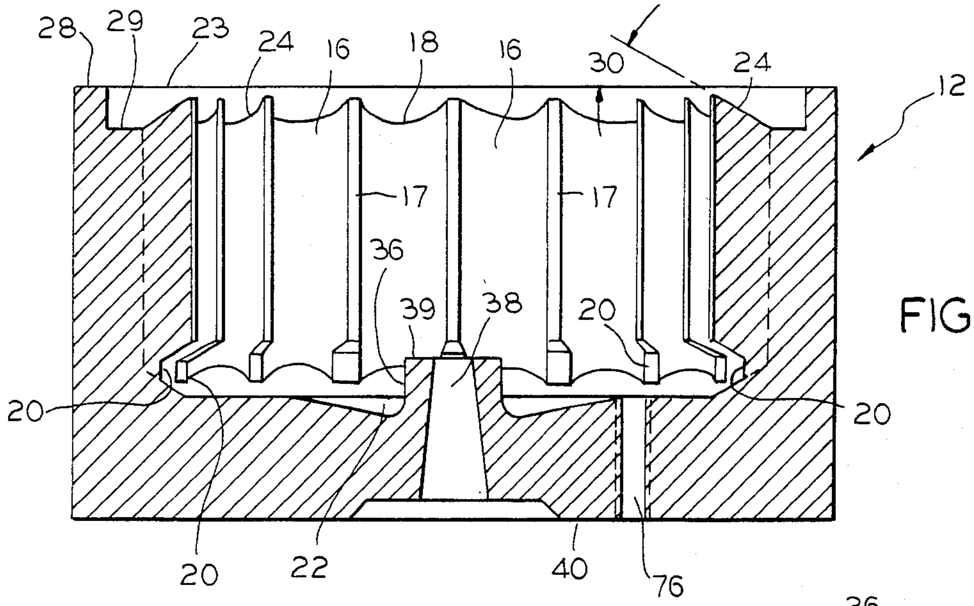
FIG. 4 is a sectional view of the bowl, taken on the plane of the line 4—4 in FIG. 3.

A neck 36 is centrally positioned in the bowl 12 and extends outward from the bottom 22. The neck 36 includes an opening 38 to receive the spindle 14. The opening 38, as may be seen in FIG. 4, is inclined and increases in cross sectional area from the outer end 39 of the neck 36 to the outside surface 40 of the bowl 12. The outer end 42 of the spindle 14 is threaded and protrudes out from the outer end 39 of the neck 36.

A baffle or deflector plate 44 (FIGS. 1, 2, 11, 12, and 18) having a circular shape is fixidly secured to the bowl 12. The deflector plate 44 includes an annular depression 48 formed in the center of the top side 50 of the plate 44 and defined by circular ring 51 and lower wall 52. A circular opening 54 extends through the lower wall 52 of the plate 44 to the bottom side 56 of the plate 44. Finger shaped holes 58 also extend through the lower wall 52 and communicates with the opening 54. The holes 58 are spaced approximately one hundred twenty degrees (120° ) apart.

Figure 2:
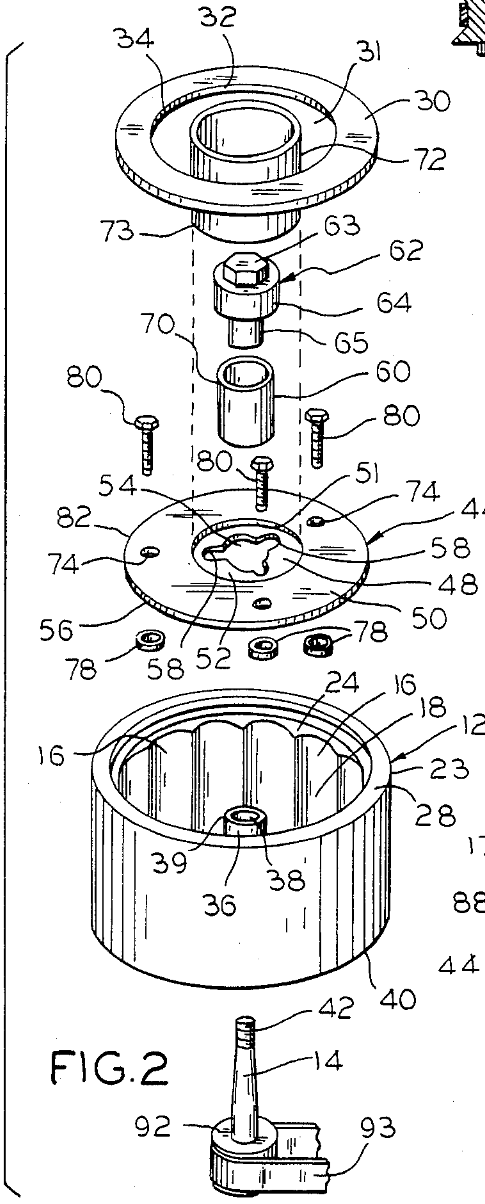
FIG. 2 is an exploded prespective view of the various parts of the bowl and attachments thereto.
Figure 5:
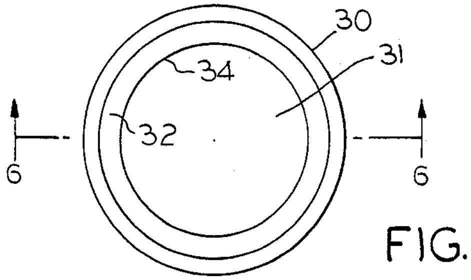
FIG. 5 is a bottom view of the cap which positions on the top of the bowl.
Figure 6:
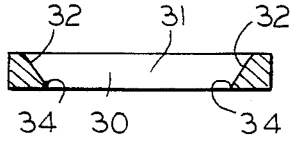
FIG. 6 is a sectional view of the cap taken on the plane of the line 6—6 in FIG. 5.
Figure 18:
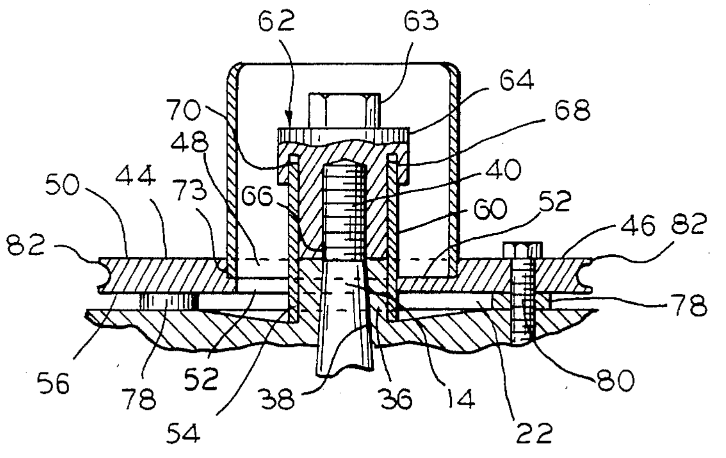
FIG. 18 is a fragmentary, side sectional view of the deflection means and the input feed tube.

A hollow sleeve 60 snugly fits over the neck 36 of the bowl 12 and press fits through the opening 54 in the deflection plate 44 (FIGS. 1, 2, and 18).

Figure 15:
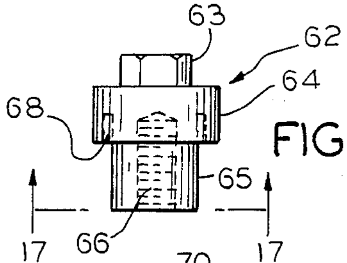
FIG. 15 is a side view of the nut member which is threadedly positioned on the spindle of the device.
Figure 16:
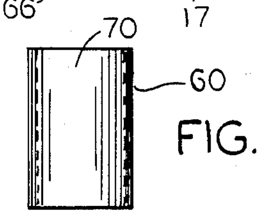
FIG. 16 is a side view of the sleeve insulating the rotating mechanism of the device from the material fed into the bowl.

A nut 62 (FIGS. 1, 15 and 18) is threadedly attached to the outer end 40 of the spindle 14. The nut 62 includes an hexagonal head 63, positioned on the top of an annular shoulder 64. A stem 65 having a threaded aperature 66 extends downward from the shoulder 64 for attaching to the threaded outer end 42 of the spindle 14.

Figure 17:
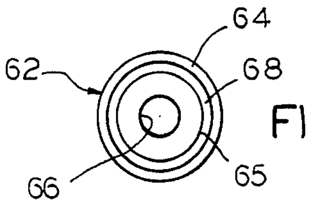
FIG. 17 is a bottom view of the nut member in FIG. 15 and viewed as indicated.

An annular groove 68 is formed in the shoulder 64 (FIGS. 15 and 17) to receive the upper end 70 of the sleeve 60. When the nut 62 is attached to the spindle 14, the bottom edge thereof abuts the outer end 39 of the neck 36. The sleeve 60 receives the stem 66 which is in contact with the inside surface of the sleeve 60. The cooperation of the sleeve 60 and the nut 62 prevents material in the bowl 12 from seeping into the area of the spindle 14 and the drive means 15 of the separator 10.

An input feed tube 72 press fits into the depression 48 so that the lower end 73 abuts the ring surface 51 and rests on the lower wall 52. The inside of the feed tube 72 leads into the finger holes 58. Therefore, the input feed tube 72 provides a pathway into the bowl 12 via the finger holes 58 in the deflector plate 44.

A plurality of spaced apart openings 74 are formed in the plate 44. Threaded apertures 76 are formed in the bottom 22 of the bowl 12. Spacers 78 are positioned between the inside bottom 22 of the bowl and the deflector plate 44. The height of the spacers 78 are dimensioned so that the plate 44 is substantially aligned with the grooves 20 in the bowl 12. Screw members 80 pass through the openings 74, spacers 78, and are threadedly received in the apertures 76 to secure the deflector plate 44 to the bowl. As may be seen from FIG. 1, the circular outer edge 82 of the plate 44 is spaced from the ribs 17. Three screw members 80 are spaced 120° apart for attaching the plate 44 to the bowl.

The bowl rotates within a disposal chamber 84. Unwanted substances or substances that may require further separation for later use are discharged from the separator 10 via opening 86 in the disposal chamber 84.

Figure 7:
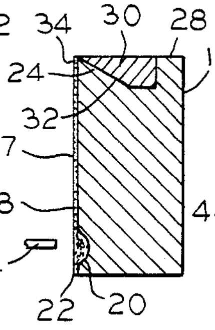
FIG. 7 is a fragmentary sectional view of the rib of the bowl, taken on the plane of the line 7—7 in FIG. 3, and showing the mercury wall along the surface of the rib and in the groove of the rib.
Figure 8:
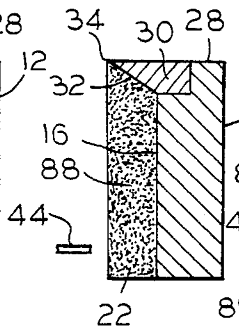
FIG. 8 is a fragmentary sectional view of a scalloped compartment, taken on the plane of the line 8—8 in FIG. 3, and showing the wall of mercury inside the compartment.

A media substance 88 such as mercury (FIGS. 7, 8 and 9) is inserted into the bowl to fill up the compartments 16 between the cap 30 and the bottom 22 of the bowl, as the bowl is acted upon by the centrifugal force. The mercury 88 also covers the ribs 17 of the bowl 12. The build up of mercury provides a cylindrical wall between the lip 34 of the cap 30 covering the compartments 16 and the bottom 22 of the bowl. The mercury 88 completely fills the compartments and is evenly distributed in the compartments due to the access between compartments afforded by the grooves 20 in the ribs 17. Mercury 88 injected into the bowl may overflow into the discharge chamber 84 under the action of the centrifugal force, when the circulating mercury 88 is of sufficient quantity to scale the barrier of the lip 34 of the cap 30. This would occur after the compartments 16 and the space under the lip 34 of the cap 30 have been filled with the mercury 88.

The separator 10 selectively separates fine particles of metal from fine particles of sand and the like. Prior to using the separator 10, the desired size particle mixture is prepared. Mixed particles of metal, sand, ores, clay, silt and the like are sifted through screens or sieves of size thirty (30) mesh or finer, to provide a mixture of particles smaller than 0.60 millimeters and preferably smaller than 40 microns (0.04 mm).

Figure 9:
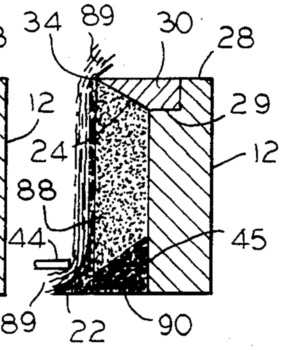
FIG. 9 is a view similar to FIG. 8, showing the layer of metal particles between the inside surface of the bowl and the slurry moving upward along the mercury wall and discharged out from the bowl.
Figure 3:
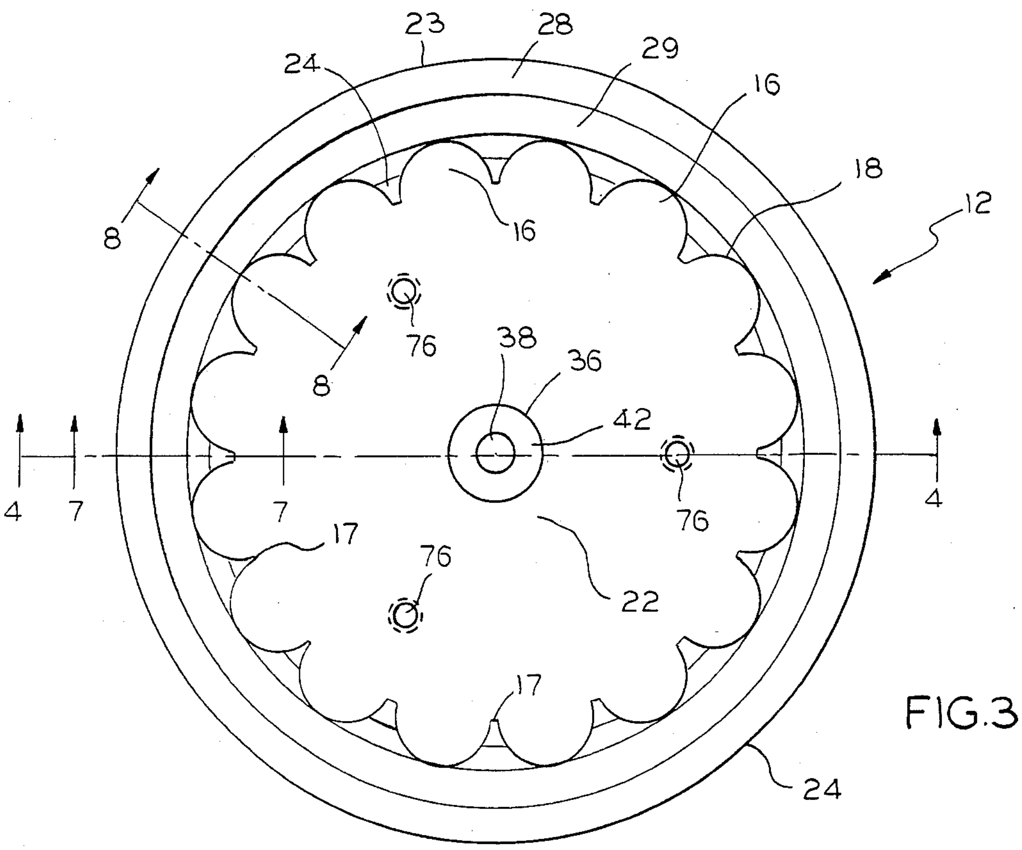
FIG. 3 is a top view of the bowl.

After the fine particles of the metal, sand and the like have been separated from the larger particles, the fine particle mixture is mixed with water to provide a liquid slurry 89 (FIG. 9). Four parts or five parts water to one part particle mixture have been found to be an acceptable slurry mixture.

The less water used in the slurry preparation, the more fine particles per unit volume are available for processing. However, less water may cause the sand particles to cling or coagulate with the metal particles and make separation of the metal particles from the sand particles more difficult. The coagulation is minimized or prevented with the use of more water. The coagulation of the mixture in water will determine the consistency of the mixture.

A quantity of the mercury 88 may be placed on the bottom 22 of the bowl 12 or may be poured into the input feed tube 72. The separator 10 is turned on to create a centrifugal force as the spindle 14 rotates and the bowl 12 revolves in response thereto, to cause the mercury to propel and fly outward against the surface of the compartments 16 and the defining surfaces of the grooves 20. Thereafter, the mercury 88 moves outward within the space of the compartments 16 toward the top 23 of the bowl 12 until reaching the cap 30. The deflector plate 44 confines and guides the mercury substances toward the lower part of the inside surface 18 of the bowl. The mercury 88 is built up inside the compartments and over the ribs 17 to construct the cylindrical wall around the inside surface 18 of the bowl. If the quantity of the mercury appreciably exceeds the volume of the scalloped compartments 16, the excess mercury in the rotating bowl would spill over the lip 34 of the cap 30 into the disposal chamber 84.

After the cylindrical wall of mercury 88 has been formed around the bowl 12, the slurry particle mixture 89 is injected into the bowl 12 by pouring the slurry 89 into the input feed tube 72. The slurry 89 (FIG. 9) under the centrifugal force acting in the bowl 12, is hurled against the mercury wall 88 at the lower part of the bowl. The particles of metal contacting the mercury media 88 which have a specific gravity greater than the specific gravity of the mercury media will penetrate the mercury and move in the media toward the inside surface 18 of the bowl. The particles which have a specific gravity less than the mercury will be rejected by the mercury media 88. The slurry 89 moves outward along the mercury media toward the top 23 of the bowl and finally spills over the lip 34 of the cap 30 into the disposal chamber 84 (FIG. 1).

The particles of metal heavier than the mercury media 88 that had contacted and penetrated the mercury will continue to move through the mercury until reaching the inside surface 18 of the bowl 12. As the process is continued by injecting more slurry mixture 89 into the bowl, more metal particles will reach the inside surface 18 of the bowl to, in time, create a sloping layer of metal particles 90 between the inside surface 18 of the bowl and the wall of mercury 88 (FIG. 9). The effect of the build up of the layer of metallic particles 90 is to force the wall of mercury 88 further inward out of alignment with the lip 34 of the cap, which could cause the mercury 88 to move upward toward the top 23 of the bowl and flows out of the bowl into the disposal chamber 84.

Turning now more specifically to FIG. 9, it will be seen that the slurry 89 flows between the deflector plate 44 and the bottom 22 of the bowl 12 and is propelled against the lower part of the wall of mercury 88. The metallic particles having a specific gravity greater than the mercury which contact the mercury penetrate therein and travel toward the outside surface 18 of the bowl. The slurry 89 containing the particles having a specific gravity less than the mercury 88, which may include particles of clay, silt, sand and the like move upward along the mercury wall and is discharged from the bowl upon spilling over the lip 34 of the cap 30.

The drive means 15 includes a pulley 92 attached to the spindle 14. A belt 93 loops the pulley 92 at one end and at the opposite end loops a drive pulley 94 attached to shaft 95 of motor means 96. Any other suitable drive means 15 may be used for rotating the bowl 12.

A force of about 500 gs (force in terms of gravitational forces) acting in the bowl 12 has been found to be a suitable centrifugal force, although variation from this force magnitude would also provide acceptable results. However, for the recovery of smaller sized particles, greater centrifugal forces may be required in order to sufficiently increase the weight of the particles and shorten the fall or travel time of such particles, so that contact may be made with the mercury media and penetrating therein. Otherwise, only the particles in the slurry adjacent the mercury wall as the slurry flows therealong, will be in position to make contact and the other particles which may have a greater specific gravity than the mercury will spill out of the bowl with the slurry. Furthermore, the centrifugal force should also be sufficient to cause heavier particles (such as the metal particles) to free themselves from lighter particles (sand, silt, clay etc.) which may be clinging thereto.

The material for the bowl may be a stainless steel. The inside surface 18 of the bowl may be an amalgamated surface for more firmly attracting the fine metal particles penetrating the mercury media.

It is within the comtemplation of the invention that other substances than mercury could be used for the media material. Such other media substance would have a specific gravity less than the specific gravity of the metal particles desired to be separated and preferably should be a fluid substance.

The subject invention affords means for selectively collecting micron or smaller size metallic particles from mixtures of particles found in nature, such as particle mixtures from beds of clay, sand, silt or the like. The process herein affords means for separating metallic particles if contained in such mixtures having a specific gravity greater than the media substance. Therefore, if mercury is used as the media substance, metallic particles of gold and platinum, and other metals which have a greater specific gravity than mercury, may be extracted from the mixtures.

The description of the preferred embodiments of this invention is intended merely as illustrative of the subject invention, the scope and limits of which are set forth in the following claims:

We claim:

1. A process for separating fine metal particles from a mixture of particles including particles having a specific gravity greater than a media substance and particles having a specific gravity less than the media substance, including the steps of:

rotating a container;

placing said media substance in the container to provide a wall of said media substance on the inside surface of said container when the container is rotating; and injecting said mixture of particles in said rotating container to flow against said media wall, so that said greater specific gravity particles in contact with the media penetrate the media and said particles having a specific gravity less than the media are rejected by the media.

2. The process of claim 1 includes:

mixing said mixture of particles with water to provide a slurry; and injecting said slurry into the rotating container for impinging said media wall.

3. The process of claim 1, wherein:

said media substance is mercury.

4. The process of claim 1, wherein said particles having a greater specific gravity than the media are particles of metal, and includes:

rotating said container at a speed to enable said particles of metal to contact, penetrate and pass through said wall of media substance and provide a layer of said particles of metal between the inside surface of the container and the media wall.

5. The process of claim 4, wherein:

said metal particles include particles of gold.

6. The process of claim 4, wherein:

said particles of the mixture are fine particles having a size less than 60 microns.

7. The process of claim 4, includes:

continuing the injecting of said particles against said wall of the media to increase the thickness of said layer and cause the thickness of said wall of media to decrease.

8. The process of claim 1, wherein:

said wall of media substance is a substantially cylindrical surface.

9. The process of claim 1, wherein said mixture includes particles of metal and clay, sand and the like, and includes:

sifting of said mixture of particles through a screen not less than thirty mesh to provide particles not greater than 0.60 millimeters (mm).

10. The process of claim 1, wherein the container is rotated at a speed to provide a centrifugal force of 500 gs (gravities).

11. A process for selectively separating fine metal particles from a mixture of fine particles, including the steps of:

generating a centrifugal force;

subjecting a media substance to said centrifugal force to build a wall of said media; and propelling said mixture of particles against said media wall under the action of the centrifugal force, so that the particles having a specific gravity greater than the media substance contact and penetrate the media and the particles having a specific gravity less than the media are rejected by the media.

12. The process of claim 11 includes:

flowing said mixture of particles along the media wall after said mixture is propelled against the media wall.

13. A selective device for separating metal particles from a mixture of particles, comprising:

a bowl having a plurality of spaced apart compartments open to the inside of the bowl for filling up with a media substance;

drive means for rotating said bowl for generating a centrifugal force when filling up said compartments and separating said metal particles from said mixture of particles;

a cap positioned on the top of the bowl and covering said compartments, said cap extending further inward from the compartments to provide a circular lip, said media filling up said compartments and extending to said lip of the cap to provide a cylindrical wall of media.

14. A selective separator device for separating selective metal particles from a mixture of particles, comprising:

a bowl having a plurality of spaced apart compartments open to the inside of the bowl for filling up with a media substance;

drive means for rotating said bowl for generating a centrifugal force when filling up said compartments; and a cap positioned on the top of the bowl and covering said compartments, the outer edges of said compartments being inclined upward and inward and the inside of said cap being also inclined upward and inward to rest on the outer edges of the compartments.

15. A selective separator device for separating selective particles from a mixture of particles comprising:

a bowl having a plurality of spaced apart compartments open to the inside of the bowl for filling up with a media substance;

a neck centrally disposed in the bottom of the bowl and extends upward therefrom;

an opening formed in the bottom of the bowl and through said neck;

drive means for rotating said bowl for generating a centrifugal force when filling up said compartments for separating said selective particles, said drive means comprising a spindle positioned in said opening of the bowl; and attaching means for securing the spindle to the bowl, said drive means causing said spindle to rotate and said bowl revolving in response to the rotation of the spindle.

16. The separator of claim 15, wherein said outer end of the spindle is threaded and extends out from the neck, and said attaching means comprises:

a hollow sleeve open at both ends, one of said ends being positioned on said neck and covering the outer end of the spindle; and a nut member secured on said outer end of the spindle and having a shoulder for closing the other end of the sleeve.

17. The separator of claim 16, wherein:

said shoulder includes an annular groove for receiving said other end of the sleeve.

18. A selective separator device for separating selective particles from a mixtures of particles, comprising:

a bowl having a plurality of spaced apart compartments open to the inside of the bowl for filling up with a media substance;

drive means for rotating said bowl for generating a centrifugal force when filling up said compartments;

a deflector plate having a top side and a bottom side, said top side including a recessed area having at least one hole therein; and an input feed tube having a lower end positioned in said recessed area of the plate, said tube being hollow and communicating with said hole to provide a pathway into the bowl for substances deposited in the bowl.

19. The separator of claim 18, wherein said recessed area further including an opening and said separator comprises:

a hollow sleeve open at both ends, a neck centrally disposed in the bottom of the bowl and extending upward therefrom;

an opening formed in the bottom of the bowl and through said neck;

said drive means comprising a spindle positioned in said opening of the bowl and extending out from said neck, said spindle including a threaded outer end, said sleeve passing through said opening of the deflector plate and one end thereof being positioned on said neck; and a nut member secured on the outer end of the spindle and having a shoulder for closing the other end of the sleeve, said input feed tube being encircled around said sleeve.

* * * * *